United States Patent [19]

Bezard et al.

[11] Patent Number: 5,661,454
[45] Date of Patent: Aug. 26, 1997

[54] DATA DISPLAY DEVICE FOR A VEHICULAR HIGHWAY DRIVER

[75] Inventors: Jean-Jacques Bezard, Chatou; Robert Faure, Le Plessis Robinson, both of France

[73] Assignees: Regie Nationale des Usines Renault, Boulogne Billancourt; Magneti Marelli France, Nanterre, both of France

[21] Appl. No.: 374,090

[22] Filed: Jan. 18, 1995

[30] Foreign Application Priority Data

Jan. 18, 1994 [FR] France .................. 94-00463

[51] Int. Cl.⁶ .................. B60Q 1/00; G02B 27/14; G09G 5/00
[52] U.S. Cl. .................. 340/461; 340/980; 359/630; 359/631; 359/13; 345/7; 345/9
[58] Field of Search .................. 340/461, 980; 345/7, 8, 9; 359/630, 631, 632, 633, 13, 14; 348/115

[56] References Cited

U.S. PATENT DOCUMENTS

| | | | |
|---|---|---|---|
| 4,729,634 | 3/1988 | Raber | 359/630 |
| 4,763,990 | 8/1988 | Wood | 345/7 |
| 5,037,182 | 8/1991 | Groves et al. | 359/630 |
| 5,140,465 | 8/1992 | Yasui et al. | 359/633 |
| 5,157,548 | 10/1992 | Monnier | 359/630 |
| 5,200,844 | 4/1993 | Suvada | 348/115 |
| 5,210,624 | 5/1993 | Matsumoto et al. | 359/630 |
| 5,231,379 | 7/1993 | Wood et al. | 359/630 |
| 5,379,132 | 1/1995 | Kuwayama et al. | 359/630 |
| 5,506,595 | 4/1996 | Fukano et al. | 359/630 |

FOREIGN PATENT DOCUMENTS

| | | |
|---|---|---|
| 420228A3 | 4/1991 | European Pat. Off. . |
| 450553A3 | 10/1991 | European Pat. Off. . |

*Primary Examiner*—Brent A. Swarthout
*Assistant Examiner*—Van T. Trieu
*Attorney, Agent, or Firm*—Oblon, Spivak, McClelland, Maier & Neustadt, P.C.

[57] ABSTRACT

A vehicle data display device which draws the attention of the driver to a particular sector of the road scene, including an optical system that presents to the driver a reduced virtual image of the road scene embellished with a luminous signal. The luminous signal can be used to designate a target for the driver and can be under the control of an onboard driving assistance system. The vehicle data display device can be integrated into the steering column or dashboard of the vehicle and facilitates perception of driving assistance or navigational data without the driver having to turn his attention away from the road.

12 Claims, 5 Drawing Sheets

DATA DISPLAY DEVICE FOR A VEHICULAR HIGHWAY DRIVER

BACKGROUND OF THE INVENTION

1. Field of the Invention

This invention pertains to the area of driving aids for motor vehicles. More specifically it pertains to a device which is intended to facilitate perception of driving assistance data or navigational assistance for the driver of a vehicle without the driver having to turn his attention away from the road.

2. Discussion of the Background

Numerous data display devices for vehicular highway drivers have already been proposed. For example, one can refer to the documents U.S. Pat. No. 4,729,634, EP-A-0,420,228 and EP-A-0,450,553.

The document U.S. Pat. No. 4,729,634 is concerned principally with enlarging the instantaneous field of vision of the image and projecting the virtual image of the latter to infinity.

The document EP-A-0,420,228 discloses a display device in which the windshield has two external sides which are not parallel in order to cause generation of spurious images.

The document EP-A-0,450,553 discloses a display device which includes a mirror-based optical device in which a mirror is movable as a function of the vehicle speed in order to modify enlargement of the virtual image of the imager and the position of this virtual image as a function of vehicle speed.

However, the known devices do not allow the driver to maintain a complete view of the road scene in all cases when he is consulting the display data.

SUMMARY OF THE INVENTION

Accordingly, one object of this invention is to provide a novel display device for a vehicular highway driver, which provides the driver with legible data without taking his eyes off the road ahead.

The above and other objects are achieved according to the present invention by providing a new and improved data display device for a vehicular highway driver which will attract the attention of the latter on a particular area of the road scene. This device includes an optical system which allows one to offer the driver a reduced image of the road scene embellished with a luminous signal.

The present invention also envisages superimposition of the resulting road scene image on a second image, which is provided by a secondary image generator. For this purpose the optical system includes a partially reflecting element which ensures mixing of the luminous signal and the virtual image of the road scene. According to one embodiment of the invention, the virtual image and the luminous signal are then in the same plane.

According to one embodiment of the invention, the reduced virtual image generator includes a negative (diverging) optical system. Preferably the negative optical system includes diverging lenses and/or diverging reflector lenses.

According to one embodiment of the invention, the optical system includes at least one diverging lens and a prism, which can be discrete elements or integrally formed.

According to one embodiment of the invention, the semi-reflecting element is a plane mirror which intercepts the luminous rays coming from the virtual image and an image generator. Preferably, the two sides of the semi-reflecting plane mirror are not parallel. The semi-reflecting element may be a convex mirror which intercepts the luminous rays coming from the virtual image and an image generator. In another embodiment, the semi-reflecting element consists of one side of the prism.

According to one embodiment of the invention, the image generator is placed under control of an onboard driver assistance system. According to one embodiment of the invention, the luminous signal designates a target to the driver.

According to one embodiment of the invention, the driver perceives the reduced image of the road scene and the luminous signal on the pupil of a sight which is integrated with his steering column.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
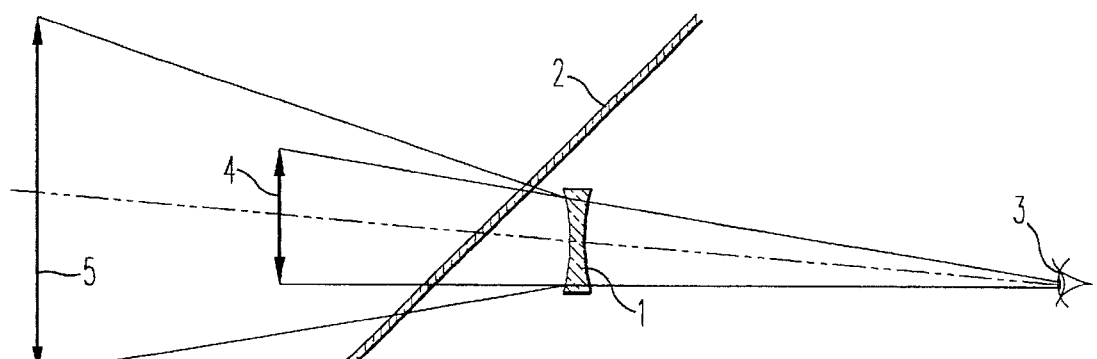
FIGS. 1, 2 and 3 are schematic illustrations of the optical system which is used in the invention to produce for the driver a reduced image of the road scene.

Referring now to the drawings, wherein like reference numerals designate identical or corresponding parts throughout the several views, and more particularly to FIG. 1 thereof, there is shown schematically a diverging lens 1 placed between the windshield 2 of a vehicle and the eye 3 of its driver. Relative placement of the lens 1, eye 3 and road scene 5 is such that the lens produces for the eye a reduced virtual image 4 of the road scene 5 approximately in its focal plane. By selecting an appropriate lens and by placing the latter near the windshield 2, it is in effect possible to obtain the virtual image 4 at about 1.5 m from the eye 3 of the driver, thereby presenting to the latter a reduced image 4 of the road scene that he can observe without any particular effort without turning his attention away from the road ahead of him.

The use of a reduced virtual image generator of the road scene constitutes an essential characteristic of the invention.

Such a reduced virtual image is obtained preferably by using a diverging optical system, preferably one based on a diverging lens or a diverging mirror (convex).

Figure 2:
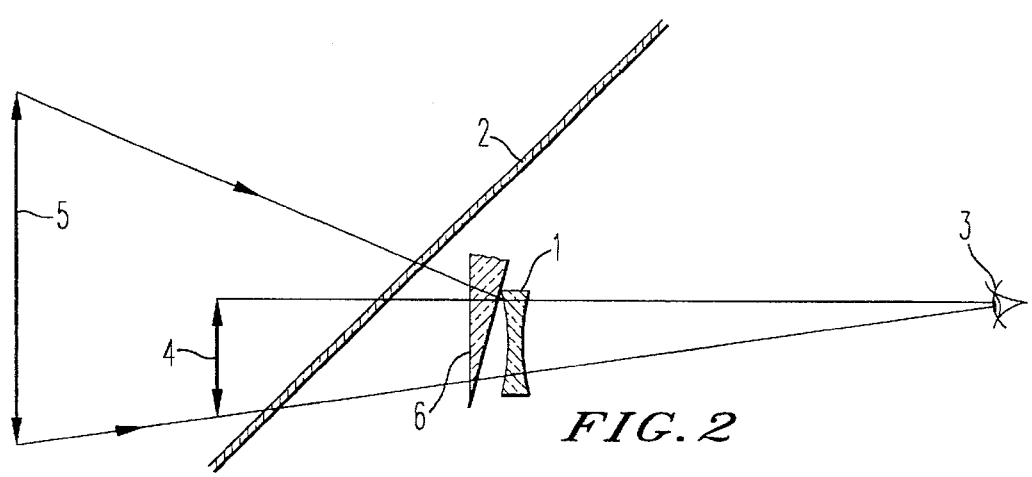

As shown in FIG. 2, the lens 1 can advantageously be coupled to a prism 6 with a horizontal edge, intended to divert the luminous beam of the road scene 5 toward lens 1. This arrangement allows one to obtain the same result as previously, without placing the optical system at the center of the windshield 2.

Figure 3:
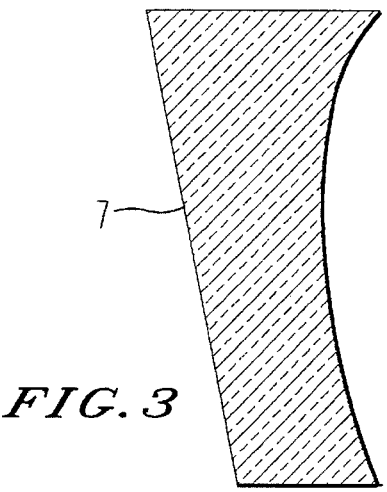

FIG. 3 illustrates a measure which can be applied to the optical system shown in FIG. 2. This measure consists in forming the lens and the prism as a single part 7 which fulfills both functions. It allows one to suppress spurious images which can result from passage of the luminous rays through two successive diopters between the lens and the prism. The part 7 will advantageously be molded as a thermoplastic material such as methyl polymethacrylate (plexiglass).

Figure 4:
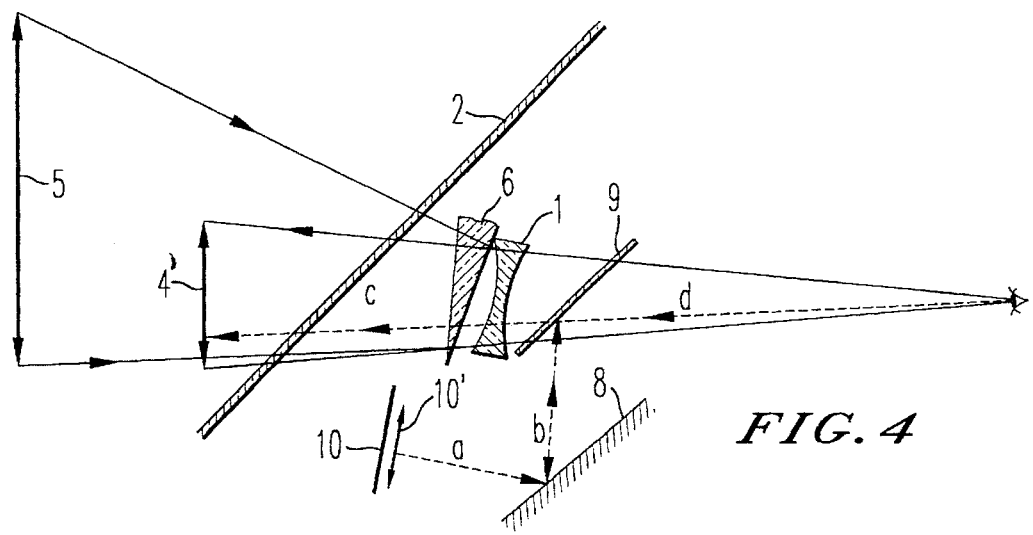
FIG. 4 is a schematic illustration of a complete first embodiment of the invention to reduce the road scene and superimpose data on the virtual image of the latter.

As shown in FIG. 4, the optical system of FIG. 2 is coupled to an image generator 10, by a first mirror 8 which is placed on the trajectory of the luminous rays emitted by the latter, and by a second mirror 9, which is semi-reflecting and ensures mixing of the reduced scene 4 and the image 10' emitted by generator 10. By placing the semi-reflecting mirror 9 at a distance c from the focal plane of lens 1, equal to the sum of the distance a separating the generator 10 from the first mirror 8 and of the distance a separating the two mirrors 8 and 9, it is possible to superimpose in the focal plane of lens 1 the reduced image 4 of the road scene and the image 10' displayed on the image generator 10. The driver then has a reduced virtual image 4 of the road scene 5 which is embellished, in its plane, by luminous signals.

Figure 5A:
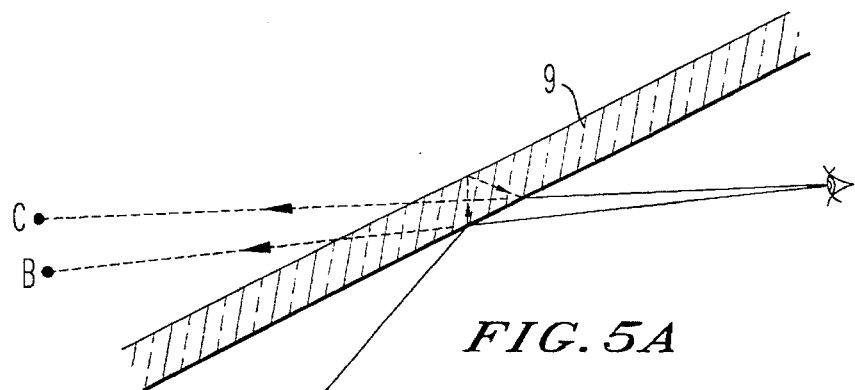
FIGS. 5A and 5B are schematic illustrations of the mixing units of FIG. 4, FIGS. 6 and 7 are schematic illustrations of variation of the embodiment of FIG. 4.

As FIG. 5A demonstrates, if the transparent mirror 9 is a mirror with two parallel sides, the image of each luminous joint A emitted by generator 10 will be doubled (B and C) by its successive reflection on each of the sides of mirror 9.

Figure 5B:
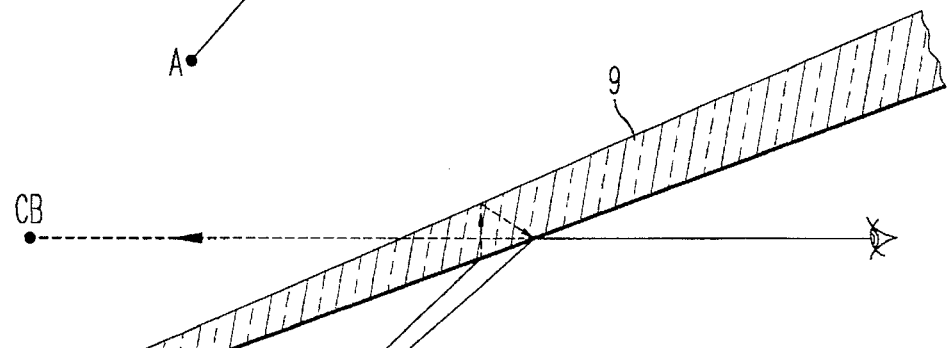

The arrangement shown in FIG. 5B, which consists of using a mirror with non-parallel sides, allows one to align the two images B and C from point A with the eye of the driver, therefore to obtain a particularly clear image of the corresponding signals.

Figure 6:
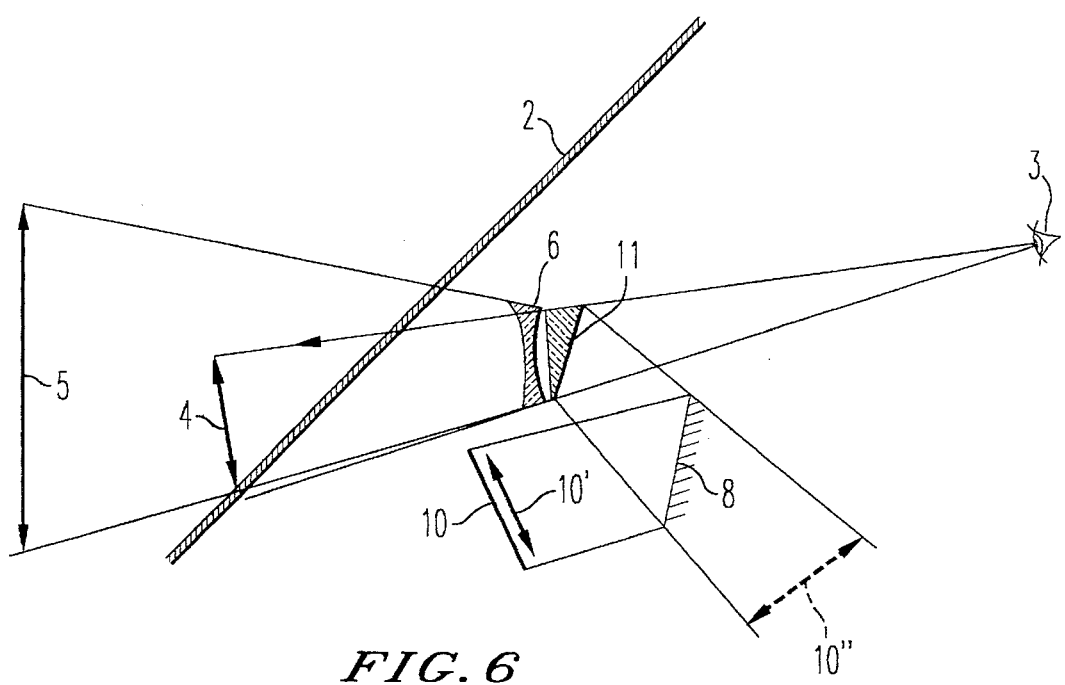
Figure 7:
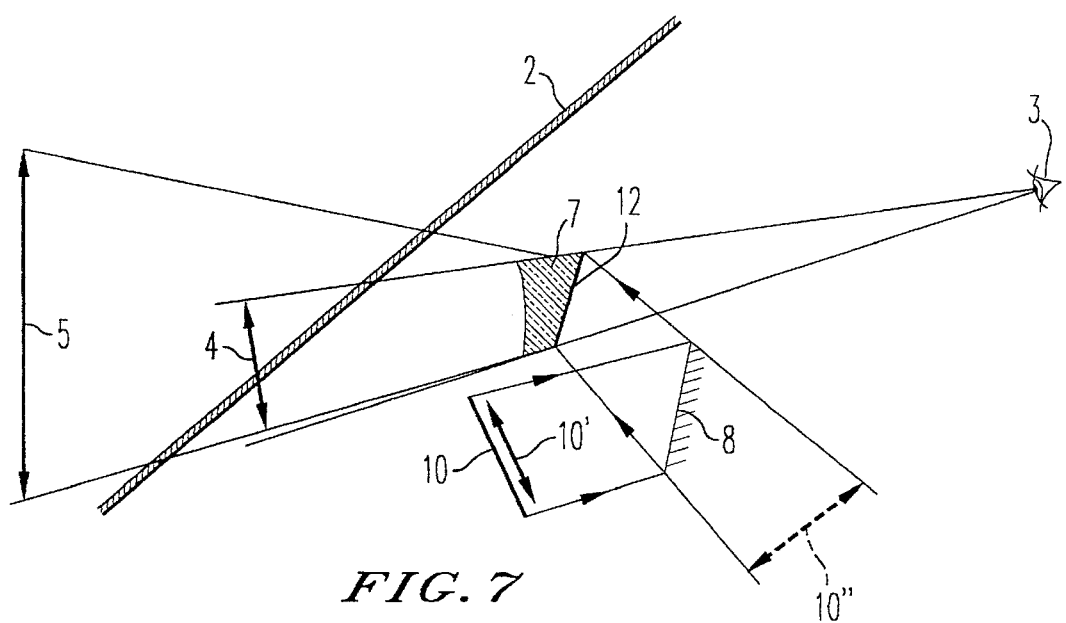

FIG. 6 shows a variation of FIG. 4, according to which the second mirror 9 is omitted. It is in effect possible to obtain the same result as previously by treating the side 11 of prism 6, receiving the luminous beams of generator 10, so that it will be semi-reflecting. The same is of course true in FIG. 7 for side 12 of integrated optical element, which as in FIG. 3 carries out functions of the diverging lens and the prism.

Figure 8:
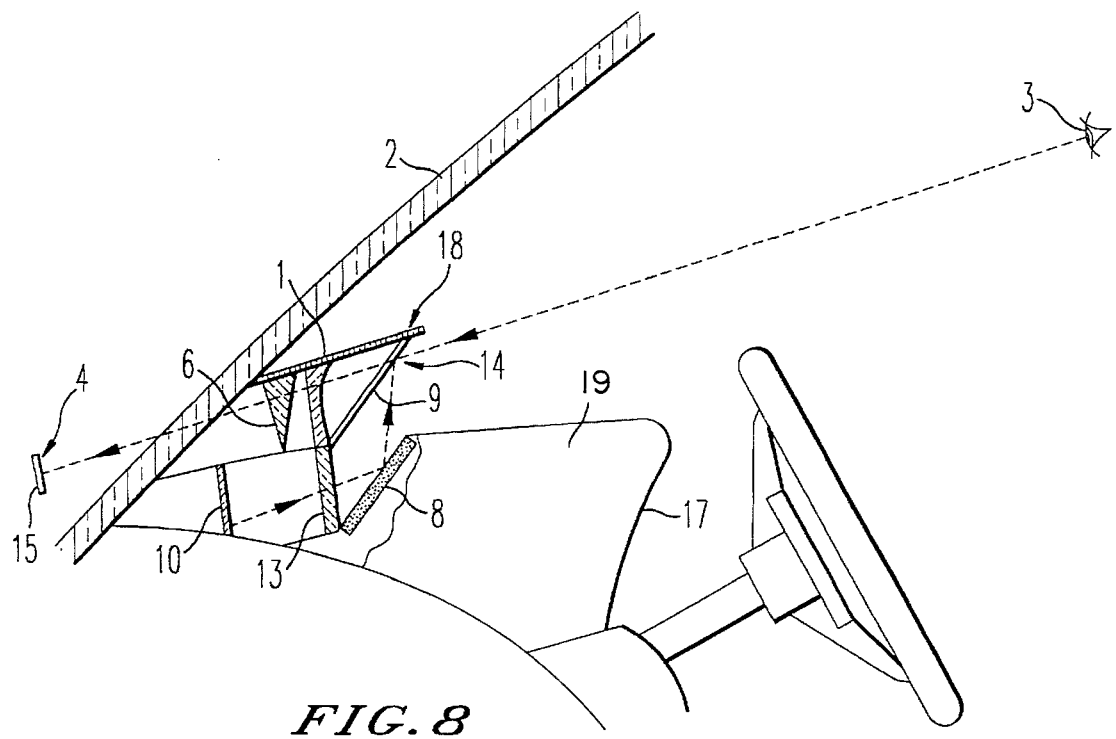
FIG. 8 is a schematic illustration of integration of the first embodiment of the invention in a dashboard.

FIG. 8 illustrates integration of the data display device which has just been described, on a passenger vehicle steering column. In conformity with this example of integration, which is not in any way limiting, it consists of assembling the optical system which is used inside a view finder 18 installed on the dashboard 19 of the vehicle. The viewfinder 18 brings together the lens 1, prism 6, semi-reflecting mirror 9, as well as the image generator 10, the first mirror 8 and a converging lens 13 placed on the trajectory of the luminous beam emitted by generator 10. Through pupil 14 of the viewfinder 18 the driver then has available an image 4 consisting of a reduced virtual image 4 of the road scene, embellished in its plane by luminous signals.

The invention has a particularly advantageous but not exclusive application in implementation of driver assistance functions, such as monitoring the distance between vehicles traveling in the same lane, following white lines, or any other system for improving road safety and/or visibility. It in effect allows one to superimpose permanently on a total view of the road synthetic visual data which are prepared from:

measurements picked up by environmental sensors (telemetry, camera, road condition sensor and sensors of atmospheric disturbances) or gathered by sensors of representative signals of functioning parameters such as steering angle, speed of the vehicle, acceleration and so forth, sophisticated systems for locality control or detection of obstacles, stored map media, or data exchanged with the infrastructure (beacons, GPS system).

When the image generator 10 is placed under the control of an onboard obstacle detection system, the invention allows one to warn the driver of one or several particularly dangerous obstacles. If the vehicle is equipped with a system for controlling the distance between vehicles proceeding along the same lane or in adjacent lanes, the proposed device can indicate to the driver in a precise way the target to be followed.

Figure 9:
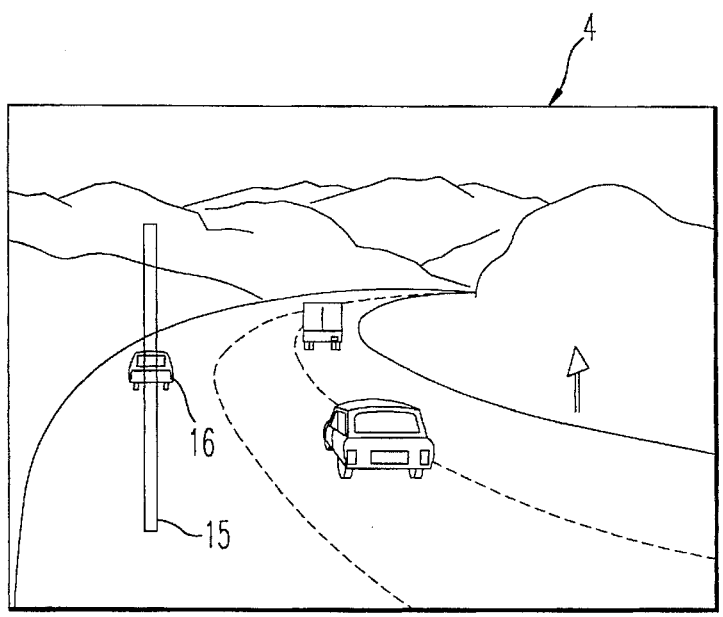
FIG. 9 is reproduction of the image perceived by the driver for the case of application of the device of the present invention for detection of a target.

In accordance with FIG. 9, the driver can perceive pupil 14 of his viewfinder 18 a luminous index 15 which designates to him the target or obstacle in question.

Without departing from the scope of the invention it is of course possible to envisage other types of integration than the one which has just been described. The image generator 10 can consist of any luminous display unit such as a cathode ray tube, a LCD display (Liquid Crystal Display) a bulb, a VFD (Vacuum Fluorescent Display). It is also possible to obtain a similar result to the one which is shown in FIG. 9 by simply replacing the aforementioned luminous display by a moving needle, which is displaced by an electric motor and responds to commands of a control system.

Finally, within the scope of the "obstacle detection" application mentioned earlier, one can provide means to "qualify" the detected object in order to determine the degree of danger, based on a parameter such as relative speed, its distance, or its transversal position. This "qualification" will be implemented in a simple way and will be directly usable by the driver by introducing into the display command some variations of color, size or brilliance of the index, intermittent display, and so forth.

Figure 10:
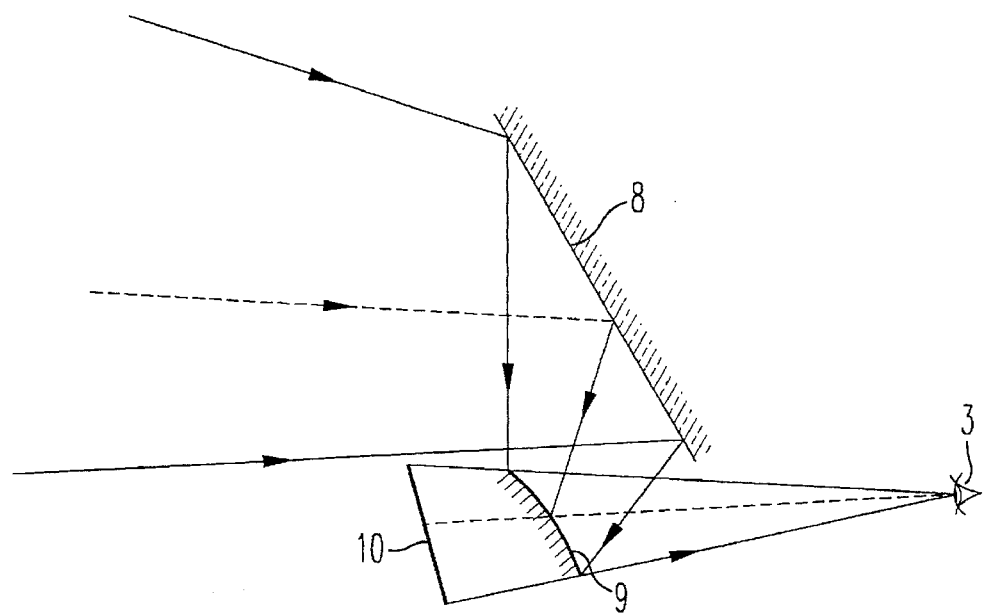
FIG. 10 is a schematic illustration of a further embodiment of the present invention.

FIG. 10 shows another embodiment of the invention according to which the reflecting mirror 9 which carries out the function of an image mixer is convex. In this case the primary mirror 8 can advantageously be placed on the trajectory of the luminous beam coming from the reduced virtual image of the road scene (after it passes through the diverging lens and the prism which are not shown in FIG. 10).

Figure 11A:
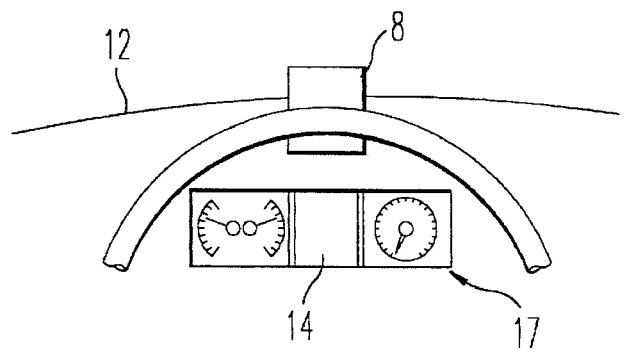
FIGS. 11A and 11B are illustrations of placements of elements of the device of FIG. 10 in a vehicular dashboard.
Figure 11B:
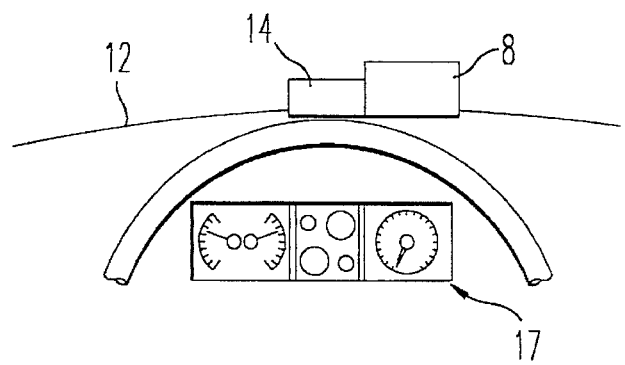

FIGS. 11A and 11B propose, by way of non-limiting examples, two versions of integration of the data display device of FIG. 10, on the steering column of the vehicle. The pupil 14 of the viewfinder can, for example, be placed in the instrument panel 17 (see FIG. 11A). This arrangement in all cases assumes that one appropriately orients generator 10, semi-reflecting mirror 9, as well as primary mirror 8 by which one perceives the opaque side above the dashboard 12. As FIG. 11B shows, it is also possible to place the pupil 14 in different positions of the steering wheel, for example on the side of mirror 8.

Thus, the display device proposed by the invention allows the driver to have available, in his usual field of view, a viewfinder through which he will be able to observe under best conditions of legibility the precise location of a luminous signal on the road scene, without turning his attention away from the latter for an instant. As indicated earlier, the applications of the display device proposed by the invention are numerous, especially in the area of driver assistance.

The use of a reduced virtual image generator of the road scene based on lenses or diverging mirrors allows one to obtain a considerable depth of field which cannot generally be obtained by means of static displays.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a data display device for a vehicular highway driver which draws the attention of a driver to a particular sector of a road scene, comprising:

an optical system presenting to the driver a reduced virtual image of the road scene embellished with a luminous signal;

a semi-reflecting element which mixes the luminous signal and the reduced virtual image of the road scene; and a diverging optical element for generating the reduced virtual image;

wherein the reduced virtual image of the road scene embellished with the luminous signal is projected for viewing by the driver so that the driver can simultaneously observe the luminous signal and the road scene in a limited field of view of the driver.

2. Data display device according to claim 1, wherein the reduced virtual image and the luminous signal are in the same plane.

3. Data display device according to claim 1, wherein the diverging optical element is one of diverging lenses and diverging reflectors.

4. Data display device according to claim 3, wherein the optical system includes at least one diverging lens and a prism.

5. Data display device according to claim 4, wherein the diverging lens and the prism are integrally formed as a single part.

6. Data display device according to claim 1, wherein the semi-reflecting element comprises:

a plane mirror which intercepts luminous rays coming from the reduced virtual image and an image generator.

7. Data display device according to claim 6, wherein the semi-reflecting plane mirror has two sides which are not parallel.

8. Data display device according to claim 1, wherein the semi-reflecting element comprises:

a convex mirror which intercepts luminous rays coming from the reduced virtual image and an image generator.

9. Data display device according to claim 4, wherein the semi-reflecting element consists of one side of the prism.

10. Data display device according to claim 6, wherein the image generator is placed under control of an onboard driving assistance system.

11. Data display device according to claim 1, wherein the luminous signal designates a target for the driver.

12. Data display device according to claim 1, comprising a viewfinder, integrated in a vehicular steering column, wherein the driver perceives the reduced virtual image of the road scene and the luminous signal on a pupil of the viewfinder.

* * * * *